(12) United States Patent
Leininger et al.

(10) Patent No.: US 8,052,935 B2
(45) Date of Patent: Nov. 8, 2011

(54) SYSTEM AND METHOD FOR REMOVING SULFUR FROM GAS STREAM

(75) Inventors: Thomas Frederick Leininger, Chino Hills, CA (US); Ke Liu, Rancho Santa Margarita, CA (US); Wei Wei, Los Angeles, CA (US); Rizeq George Rizeq, Mission Viejo, CA (US)

(73) Assignee: General Electric Company, Niskayuna, NY (US)

( * ) Notice: Subject to any disclaimer, the term of this patent is extended or adjusted under 35 U.S.C. 154(b) by 287 days.

(21) Appl. No.: 12/433,293

(22) Filed: Apr. 30, 2009

(65) Prior Publication Data
US 2010/0278702 A1  Nov. 4, 2010

(51) Int. Cl.
*F27B 15/08* (2006.01)
*F27B 15/00* (2006.01)
*B01J 8/18* (2006.01)
*B01J 19/00* (2006.01)
*B01J 8/02* (2006.01)
*B01J 35/02* (2006.01)
*B01J 8/00* (2006.01)
*B01D 53/04* (2006.01)
*B01D 53/48* (2006.01)
*C01B 17/00* (2006.01)
*C01B 17/02* (2006.01)

(52) U.S. Cl. ........ 422/144; 422/129; 422/139; 422/142; 422/145; 422/147; 422/211; 423/230; 423/244.02; 423/567.1; 423/574.1

(58) Field of Classification Search .............. 422/142, 422/144, 129, 139, 145, 147, 211; 423/230, 423/567.1, 244.02, 574.1; 48/62 R, 77, 197 R
See application file for complete search history.

(56) References Cited

U.S. PATENT DOCUMENTS

| | | | |
|---|---|---|---|
| 3,985,861 A * | 10/1976 | Hudson, Jr. | 423/244.02 |
| 4,263,271 A | 4/1981 | Henning et al. | |
| 4,275,044 A * | 6/1981 | Kamody | 423/243.03 |
| 4,478,800 A | 10/1984 | van der Wal et al. | |
| 4,609,537 A * | 9/1986 | Tolpin et al. | 423/244.02 |
| 5,130,097 A * | 7/1992 | Bissett | 422/143 |
| 6,818,194 B2 | 11/2004 | DeBerry et al. | |
| 7,060,233 B1 | 6/2006 | Srinivas et al. | |
| 7,357,905 B2 | 4/2008 | Chapat et al. | |
| 7,374,742 B2 | 5/2008 | Geosits et al. | |
| 2007/0283812 A1 | 12/2007 | Liu et al. | |

* cited by examiner

*Primary Examiner* — Walter Griffin
*Assistant Examiner* — Natasha Young
(74) *Attorney, Agent, or Firm* — Ann M. Agosti

(57) ABSTRACT

A system for removing sulfur from a gaseous stream includes (a) a reaction bed for receiving the gaseous stream and for reacting sulfur dioxide and at least some of the hydrogen sulfide of the gaseous stream into elemental sulfur to provide an elemental sulfur stream and a first product stream; and (b) a circulating fluidized bed comprising (i) a first region for receiving the first product stream and using a sulfur adsorption material to adsorb and remove any remaining hydrogen sulfide from the first product stream to generate saturated sulfur adsorption material and a second product stream substantially free of sulfur; and (ii) a second region for receiving a regeneration stream and for using the regeneration stream to regenerate the saturated sulfur adsorption material and to generate the sulfur dioxide.

12 Claims, 2 Drawing Sheets

SYSTEM AND METHOD FOR REMOVING SULFUR FROM GAS STREAM

BACKGROUND OF THE INVENTION

This invention relates to systems and methods for removing sulfur from gas streams.

Many industrial fuel gases contain sulfur compounds, such as hydrogen sulfide ($H_2S$) and carbonyl sulfide (COS). For example, synthetic gas (syngas) typically prepared by reforming or gasifying a carbonaceous fuel via partial oxidation reactions under high temperature conditions, generally comprises $H_2$, CO, steam, and gaseous contaminants including $H_2S$ and COS. The carbonaceous fuel may be any of various solid, liquid, or gaseous materials having a substantial elemental content of carbon and hydrogen. Such materials include, for example, coal or petroleum coke, biomass waste, liquid feedstocks such as heavy naphtha fractions, or gaseous feedstocks such as natural gas.

In recent years, substantial research and investment has been directed towards various syngas processes, such as Integrated Gasification Combined Cycle (IGCC) and Coal-to-Liquids (CTL) processes. IGCC is a process for generating syngas by gasification of solid or liquid fuels with the syngas then being used as a fuel source in a combined cycle power plant. CTL is a process that uses syngas from coal gasification as a raw material for generation of high-value chemicals or zero-sulfur diesel and gasoline as transportation fuels. Syngas can also be used to produce hydrogen for fuel cells. Although syngas-based technologies offer considerable improvement in both thermal and environmental efficiency, the cost of these technologies is currently impeding market penetration.

The sulfur removal process represents a significant portion of capital costs associated with IGCC plants, CTL and coal to hydrogen plants, and other plants that require removal of sulfur compounds from syngas. Three types of sulfur removal technologies have been suggested: solvent-based processes, sorbent-based processes, and direct oxidation processes. Direct oxidation processes have attempted to use air or oxygen to oxidize $H_2S$ directly to elemental sulfur in a syngas stream, but no successful example has been reported for an actual industrial application. In order to remove sulfur using liquid solvents, syngas exiting the gasifier is usually cooled to room temperatures through multiple stages which are energy and capital cost intensive. Solid sorbents, such as ZnO or MnO based sorbents are used to remove $H_2S$ in commercial scale hydrogen production from natural gas. Since the sulfur level is low in natural gas and ZnO is relatively inexpensive, regeneration of the adsorption material is not critical in such applications. Solid sorbents can also be used to remove sulfur from coal-derived syngas at warm temperatures (250° C.~600° C.). However, it is generally required to regenerate solid sorbents in such applications due to the high sulfur content in coal syngas.

Regeneration of sulfur adsorption material usually produces sulfur dioxide, which needs to be further processed using additional equipment, thereby complicating and increasing the cost of the whole system.

Accordingly, there is a need for a feasible process to remove hydrogen sulfide from gas streams while minimizing loss of thermal efficiency and process complexity.

BRIEF DESCRIPTION OF THE INVENTION

In one aspect, a system for removing hydrogen sulfide from a gaseous stream comprises (a) a reaction bed for receiving the gaseous stream and for reacting sulfur dioxide and at least some of hydrogen sulfide of the gaseous stream into elemental sulfur to provide an elemental sulfur stream and a first product stream; and (b) a circulating fluidized bed comprising (i) a first region for receiving the first product stream and using a sulfur adsorption material to adsorb and remove any remaining hydrogen sulfide from the first product stream to generate saturated sulfur adsorption material and a second product stream substantially free of sulfur; and (ii) a second region for receiving a regeneration stream and for using the regeneration stream to regenerate the saturated sulfur adsorption material and to generate the sulfur dioxide.

In another aspect disclosed herein, a gasification system comprises (a) a gasifier configured to receive a fuel and an oxidant to produce a synthesis gas comprising hydrogen sulfide; and (b) a removal system for removing hydrogen sulfide from the synthesis gas, the removal system comprising: a reaction bed for receiving the synthesis gas and for reacting sulfur dioxide and at least some of the hydrogen sulfide of the synthesis gas into elemental sulfur to provide an elemental sulfur stream and a first product stream; and a circulating fluidized bed comprising (i) a first region for receiving the first product stream and using a sulfur adsorption material to adsorb and remove any remaining hydrogen sulfide from the synthesis gas to generate saturated sulfur adsorption material and a second product stream substantially free of sulfur; and (ii) a second region for receiving a regeneration stream and for using the regeneration stream to regenerate the saturated sulfur adsorption material and to generate the sulfur dioxide.

In yet another aspect disclosed herein, a method for removing hydrogen sulfide from a gaseous stream includes reacting sulfur dioxide and at least some of the hydrogen sulfide of the gaseous stream into elemental sulfur in a reaction bed to provide an elemental sulfur stream and a first product stream; adsorbing any remaining hydrogen sulfide in the first product stream in an adsorption zone of a circulating fluidized bed to generate a saturated sulfur adsorption material and a second product stream substantially free of sulfur; and in a regeneration zone of the circulating fluidized bed, regenerating the saturated sulfur adsorption material and generating the sulfur dioxide.

DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Embodiments disclosed herein relate to systems and methods for removing sulfur from gaseous streams. Gaseous streams for which these embodiments are expected to be useful include natural gas, methane, butane, propane, diesel, kerosene, and synthesis gas (syngas) from reforming or gasification of coal, petroleum coke, bio-mass waste, gas oil, crude oil, or mixtures thereof. A gasification system is illustrated for purposes of example; however, other types of systems may also benefit from such sulfur removal processes. Sulfur compounds described herein mainly refer to $H_2S$ in the gaseous stream.

Figure 1:
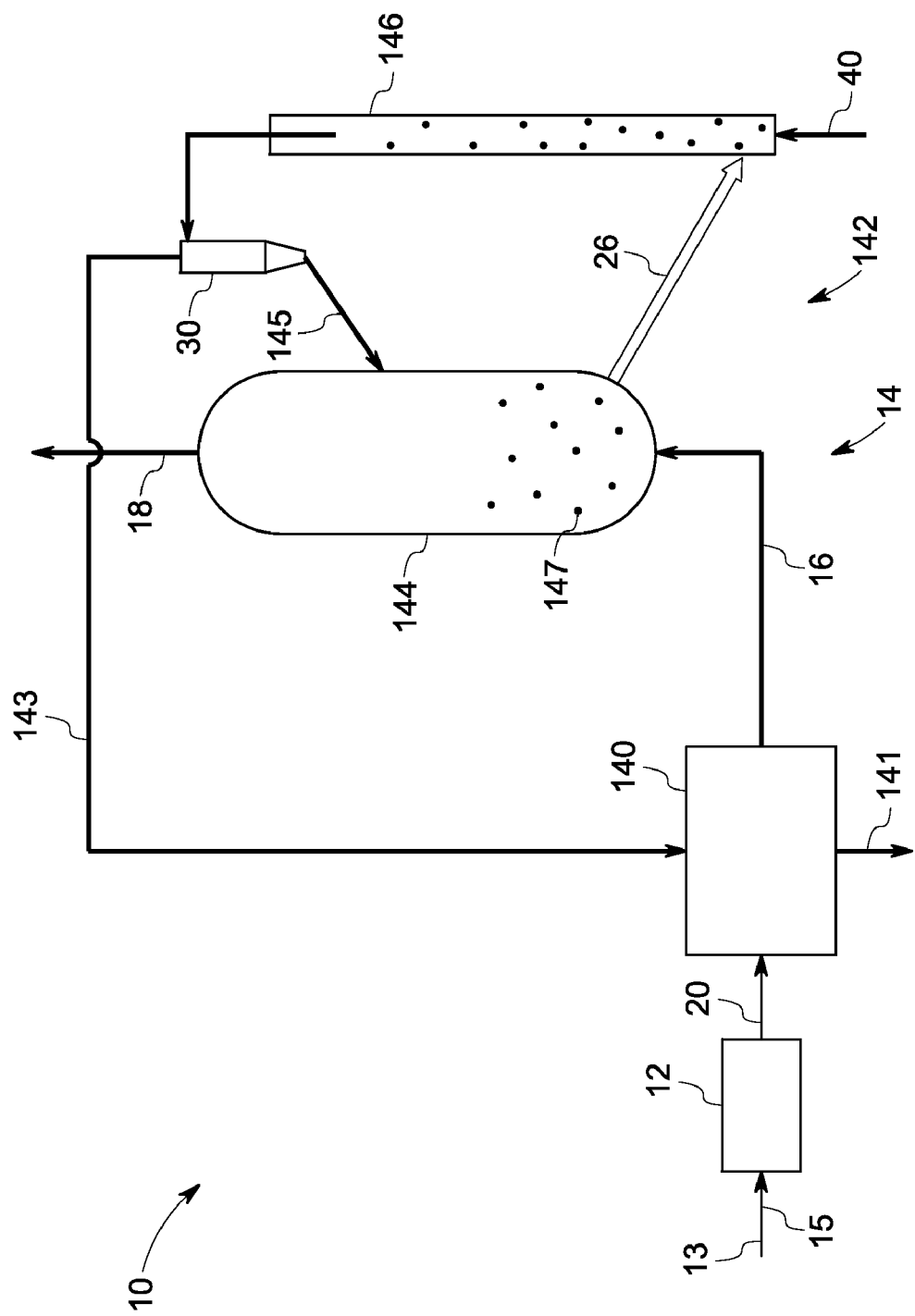
FIG. 1 is a schematic diagram of an exemplary gasification system including an exemplary sulfur removal system in accordance with a first embodiment of the present invention.

FIG. 1 represents an exemplary gasification system 10 comprising a gasifier 12 configured to receive a fuel 13 and an oxidant 15 to produce a gaseous stream (typically synthesis gas) 20 comprising hydrogen sulfide; and a sulfur removal system 14 for removing the hydrogen sulfide from the gaseous stream 20. The removal system 14 comprises: (i) a reaction bed 140 for reacting sulfur dioxide and at least some of the hydrogen sulfide of the gaseous stream 20 into elemental sulfur and to provide an elemental sulfur stream 141 and a first product stream 16; and (ii) a circulating fluidized bed 142 comprising a first region (adsorption zone) 144 for receiving the first product stream 16 and using a sulfur adsorption material 147 to adsorb and remove any remaining hydrogen sulfide from the first product stream 16 to generate saturated sulfur adsorption material and a second product stream 18 substantially free of sulfur; and a second region (regeneration zone) 146 for receiving a regeneration stream 40 to regenerate the saturated sulfur adsorption material and to generate the sulfur dioxide 143.

In this embodiment, the second region 146 is a transport reactor (such as, for example, a riser fluidized bed for a regeneration zone) in which the saturated sulfur adsorption material is regenerated via contact with air/oxygen and/or steam in the transport gas (regeneration stream 40), and regenerated sulfur adsorption material 145 is blown back to the first region 144. A cyclone 30 outside the second region 146 may be used to separate gas stream containing sulfur dioxide 143 from the regenerated sulfur adsorption material 145. The sulfur dioxide 143 from the second region 146 is sent to the reaction bed 140.

Figure 2:
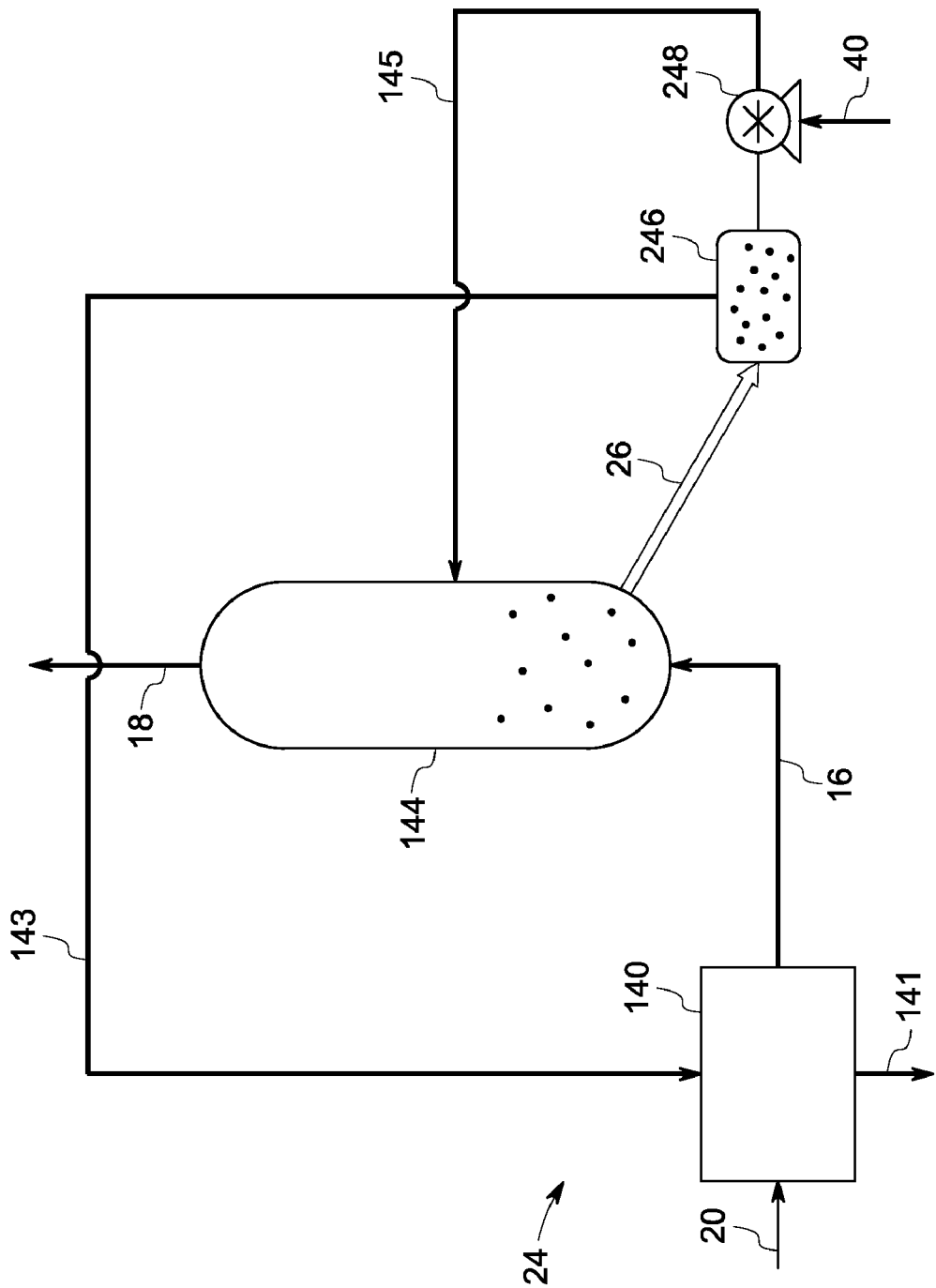
FIG. 2 is a schematic diagram of an exemplary sulfur removal system in accordance with a second embodiment of the present invention.

FIG. 2 represents a schematic diagram of an exemplary sulfur removal system 24 in accordance with a second embodiment of the present invention. The sulfur removal system 24 may be used interchangeably with, for example, the sulfur removal system 14 in the gasification system 10. In the sulfur removal system 24, the second region 246 is a moving bed reactor that regenerates the saturated sulfur adsorption material and a solid pump (such as a Posimetric® pump) 248 is used to pump regenerated adsorption material back to the first region 144 where the pressure is high while sulfur dioxide 143 is sent to the reaction bed 140.

As used herein, substantially free of sulfur means with a sulfur level of less than 20 parts per million by volume (ppmv), and saturated refers to both completely and partially saturated.

The fuel 13 may be coal, petroleum coke, biomass waste, gas oil, crude oil, or mixtures thereof. The oxidant 15 may comprise any suitable gas containing oxygen, such as for example, air, oxygen rich air, or a mixture of steam and air.

Synthesis gas 20 typically comprises CO, $H_2$, $CO_2$, and steam and may comprise COS and over 1% $H_2S$. In some embodiments, the synthesis gas further comprises un-reacted fuel. According to one aspect of the invention, in operation, the syngas may optionally go through a scrubber (not shown) to remove particulates therein and/or a COS hydrolysis unit (not shown) to convert COS therein into $H_2S$.

In the startup of the system, if there is no sulfur dioxide in the reaction bed 140, initially hydrogen sulfide in the gaseous stream 20 is not reacted in the reaction bed 140 and is all sent to the circulating fluidized bed 142. As the operation continues, sulfur dioxide from the downstream circulating fluidized bed 142 is sent to the reaction bed 140 and helps removal of hydrogen sulfide from the syngas by reacting with at least some of the hydrogen sulfide. In the reaction bed 140, the syngas 20 comes into contact with $SO_2$, reactions happen as shown in the following formula:

$$SO_2 + 2H_2S \Rightarrow 2H_2O + 3S$$

$$SO_2 + 2H_2 \Rightarrow 2H_2O + S$$

$$SO_2 + 2CO \Rightarrow 2CO_2 + S$$

If all the elemental sulfur from the above reactions is condensed into a liquid elemental sulfur stream 141 exiting the reaction bed 140, the first product stream 16 from the reaction bed 140 will contain no elemental sulfur. The first product stream 16 then enters the circulating fluidized bed 142 where solid sulfur adsorption material such as metal oxide (MO) is used to absorb unreacted $H_2S$ in the first product stream 16 via the following reaction:

$$H_2S + MO \Rightarrow MS + H_2O$$

Typically in the metal oxide sulfur adsorption material (MO), M represents at least one metal selected from zinc (Zn), magnesium (Mg), manganese (Mn), iron (Fe), copper (Cu), nickel (Ni), cobalt (Co), and cerium (Ce).

In the second region, the saturated sulfur adsorption material (MS) is regenerated via the following formula:

$$MS + 3/2 O_2 \Rightarrow MO + SO_2$$

The regeneration stream may be any proper gas stream comprising oxygen and in some embodiments, the regeneration stream may also comprise steam. When the regeneration stream comprises air, the $SO_2$ gas out from the second region 146, 246 may be recycled back to the reaction bed 140 with $N_2$.

In some embodiments, the sulfur adsorption material comprises zinc oxide (ZnO) with a small amount of iron oxide (FeO) molecules next to the ZnO site. In the adsorption bed (first region 144), the iron oxide is reduced. In the regeneration zone (second region 146, 246), the oxidation of iron releases the heat to drive the sulfur off the neighboring Zn site. In such embodiments, the main reactions in the first region 144 of the circulating fluidized bed 142 are the following:

$$ZnO + H_2S \rightarrow ZnS + H_2O \qquad \text{(reaction 1)}$$

$$FeO + Co \rightarrow Fe + CO_2 \qquad \text{(reaction 2)}$$

$$FeO + H_2 \rightarrow Fe + H_2O \qquad \text{(reaction 3)}$$

As shown in reaction 1 above, the $H_2S$ reacts with the ZnO and forms zinc sulfide (ZnS) in the first region 144. The spent sulfur adsorption material saturated with sulfur flows to the second region 146, 246 under gravity through a conduit 26. The main reactions in the second region 146, 246 in this case are the following:

$$Fe + 1/2 O_2 \rightarrow FeO + Heat \qquad \text{(reaction 4)}$$

$$ZnS + O_2 + H_2O + Heat \rightarrow ZnO + SO_2 + H_2S \qquad \text{(reaction 5)}$$

$$ZnS + H_2O \rightarrow H_2S + ZnO \qquad \text{(reaction 6)}$$

In operation, the reactions 1-3 in the first region 144 generate heat that raises the temperature of the first region 144 and thus the temperature of the second product stream 18 to from about 250 degrees Celsius to about 550 degrees Celsius. In some embodiments, if any additional heat for reaction 5 is needed, an oxidant such as air or $O_2$ may be introduced into the second region 146, 246, which is also referenced herein as the regeneration zone. In certain embodiments, the gaseous stream 20 comprises synthesis gas and the second product stream 18 is essentially a synthesis gas substantially free of sulfur. The temperature range of the second product stream 18 is ideal for introducing the synthesis gas into a gas turbine (not shown) to generate power. Thus the system 10 may generate synthesis gas at an appropriate temperature for power generation in a gas turbine without incorporating any additional heating device as required by current sulfur removal processes.

In some embodiments, the sulfur adsorption material comprises oxides of Mn and Mg, wherein the first region (adsorption zone) 142 is configured to operate at temperatures ranging from about 300 degrees Celsius to about 600 degrees Celsius. The particle size of the sulfur adsorption material, in one example, ranges from about 40 microns to about 350 microns.

As shown in FIG. 1 and FIG. 2, in operation, saturated sulfur adsorption material from the first region flows under gravity to the second region 146, 246 (regeneration zone) through the conduit 26. However, the saturated adsorption material can be sent from the first region 144 to the second region 146, 246 by any means known in the art.

For use in the fluidized beds, the particle sizes of the sulfur adsorption material is generally in the range between about 10 to about 400 microns, and more specifically between about 40 to about 350 microns. In some embodiments, $CO_2$ sorption material may be optionally added into the sulfur adsorption material to capture $CO_2$ in the gas stream 20.

A circulating fluid bed is a fluid bed process whereby metal oxide and any other particles are continuously removed from the adsorption zone (whether in up flow or down flow orientation) and are then re-introduced into the adsorption zone after regeneration to replenish the supply of solids. At lower velocities, while the inorganic metal oxide is still entrained in the gas stream, a relatively dense bed is formed in adsorption zone.

There are several ways the sulfur adsorption material may be manufactured to get the right particle size and the desired properties. The main requirements for the sulfur adsorption material are capability to adsorb sulfur, attrition resistance, capability to withstand high temperature, and sufficient surface area for facilitating the adsorption and regeneration process. In order to manufacture the sulfur adsorption material, in some embodiments, an organic or inorganic binder (e.g. alumina binder) is used along with water and a surfactant to make slurry. The metal precursor (such as ZnO) is added to the slurry and the slurry is then spray dried and heated to a temperature ranging from about 300 degrees Celsius to about 600 degrees Celsius to form particles. The particles are subsequently calcined at between about 700 degrees Celsius to about 900 degrees Celsius C to increase the attrition resistance property of the sulfur adsorption material.

As discussed above, one issue with conventional solvent-based sulfur removal systems is that they require the syngas cool to room temperature or below room temperature. After sulfur removal, the syngas then has to reheat back to high temperature either for down stream synthesis processes or send to gas turbine for power generation. The cooling and heat of the huge syngas stream makes the traditional sulfur removal processes inefficient and/or uneconomical. The systems described herein do not need cooling processes and are more efficient, compact and economical.

The sulfur removal processes described herein provides a low cost sulfur removal technology for IGCC, coal to $H_2$, and coal to liquids plants, and other applications. This process eliminates multiple cooling/heating steps and unit operations of the conventional sulfur removal processes. The techniques described herein also do not require any moving parts or temperature swing techniques that are used in conventional solvent processes and thus increase the efficiency of the sulfur removing process.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention covers all suitable modifications and variations as come within the scope of the appended claims and their equivalents.

What is claimed is:

1. A system for removing hydrogen sulfide from a gaseous stream comprising:
    (a) a reaction bed for receiving the gaseous stream and for reacting sulfur dioxide and at least some of the hydrogen sulfide into elemental sulfur to provide a first product stream and an elemental sulfur stream; and
    (b) a circulating fluidized bed comprising:
        (i) a first region for receiving the first product stream and using a sulfur adsorption material to adsorb and remove any remaining hydrogen sulfide from the first product stream to generate a saturated sulfur adsorption material and a second product stream substantially free of sulfur; and
        (ii) a second region for receiving a regeneration stream and for using the regeneration stream to regenerate the saturated sulfur adsorption material and to generate the sulfur dioxide sent to the reaction bed.

2. The system of claim 1, wherein the sulfur adsorption material comprises zinc oxide and iron oxide.

3. The system of claim 1, wherein the sulfur adsorption material comprises a metal oxide comprising at least one metal selected from zinc (Zn), magnesium (Mg), manganese (Mn), iron (Fe), copper (Cu), nickel (Ni), cobalt (Co), and cerium (Ce).

4. The system of claim 1, further comprising a cyclone for separating the regenerated sulfur adsorption material to be sent to the first region from the sulfur dioxide to be sent to the reaction bed.

5. The system of claim 1, further comprising a solid pump for pumping the regenerated sulfur adsorption material to the first region.

6. The system of claim 1, wherein the regeneration stream comprises oxygen.

7. The system of claim 1, wherein the gaseous stream comprises synthesis gas.

8. A gasification system comprising:
    (a) a gasifier configured to receive a fuel and an oxidant to produce a synthesis gas comprising hydrogen sulfide; and
    (b) a removal system for removing the hydrogen sulfide from the synthesis gas, the removal system comprising:
        (i) a reaction bed for receiving the synthesis gas and for reacting sulfur dioxide and at least some of the hydrogen sulfide of the synthesis gas into elemental sulfur to provide a first product stream and an elemental sulfur stream; and
        (ii) a circulating fluidized bed comprising: a first region for receiving the first product stream and using a sulfur adsorption material to adsorb and remove any remaining hydrogen sulfide from the first product stream to generate a saturated sulfur adsorption material and a second product stream substantially free of sulfur; and a second region for receiving a regeneration stream and for using the regeneration stream to regenerate the saturated sulfur adsorption material and to generate the sulfur dioxide sent to the reaction bed.

9. The gasification system of claim 8, wherein the fuel comprises coal, petroleum coke, bio-mass waste, gas oil, crude oil, or mixtures thereof.

10. The gasification system of claim 8, further comprising a cyclone for separating the regenerated sulfur adsorption material to be sent to the first region from the sulfur dioxide to be sent to the reaction bed.

11. The gasification system of claim 8, further comprising a solid pump for pumping the regenerated sulfur adsorption material to the first region.

12. The gasification system of claim 8, wherein the synthesis gas comprises COS and the gasification system further comprises a COS hydrolysis unit to convert COS in the synthesis gas into hydrogen sulfide.

* * * * *